United States Patent
Kimba Dit Adamou et al.

(10) Patent No.: US 11,665,723 B2
(45) Date of Patent: *May 30, 2023

(54) FIRST STATION, SECOND STATION AND NON-TRANSITORY COMPUTER-READABLE STORAGE MEDIUM

(71) Applicant: VIVO MOBILE COMMUNICATION CO., LTD., Chang'an Dongguan (CN)

(72) Inventors: Boubacar Kimba Dit Adamou, Chang'an Dongguan (CN); Wei Bao, Chang'an Dougguan (CN); Xueming Pan, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/523,413

(22) Filed: Nov. 10, 2021

(65) Prior Publication Data

US 2022/0132511 A1 Apr. 28, 2022

Related U.S. Application Data

(63) Continuation of application No. 16/763,172, filed as application No. PCT/CN2018/109718 on Oct. 10, 2018, now Pat. No. 11,291,011.

(30) Foreign Application Priority Data

Nov. 17, 2017 (CN) .......................... 201711149113.8

(51) Int. Cl.
*H04W 72/53* (2023.01)
*H04W 76/15* (2018.01)
(Continued)

(52) U.S. Cl.
CPC ........... *H04W 72/53* (2023.01); *H04L 5/0092* (2013.01); *H04W 72/0446* (2013.01);
(Continued)

(58) Field of Classification Search
CPC ............... H04L 5/0035; H04L 5/0092; H04W 72/0493; H04W 72/0446; H04W 72/0453; H04W 72/082; H04W 76/11
See application file for complete search history.

(56) References Cited

U.S. PATENT DOCUMENTS

| 11,291,011 B2 * | 3/2022 | Kimba Dit Adamou ................... H04W 72/27 |
| 2011/0249642 A1 * | 10/2011 | Song ..................... H04W 28/16 370/329 |

(Continued)

FOREIGN PATENT DOCUMENTS

CN 104168624 A 11/2014

OTHER PUBLICATIONS

R1-1710173, Source: Guangdong OPPO Mobile Telecom, "Discussion on the NR-LTE self-interference issue" Document for: Discussion and Decision, Agenda item: 5.1.8, Release: 3GPP TSG RAN WG1 NR Ad-Hoc#2, Jun. 27-30, 2017, Qingdao, P.R. China.

(Continued)

*Primary Examiner* — Jael M Ulysse
(74) *Attorney, Agent, or Firm* — von Briesen & Roper, s.c.

(57) ABSTRACT

A first base station receives first information transmitted by a second base station, the first information includes identification information of a UE, identification information of a first serving cell of the UE, and service frequency of the first serving cell, and the second base station is a serving base station of the first serving cell. If the first base station determines that the UE is self-interfered, the first base (Continued)

station transmits notification information to the second base station, the notification information is used to negotiate with the second base station to allocate a different resource to the UE.

20 Claims, 7 Drawing Sheets

(51) Int. Cl.
  *H04W 76/11* (2018.01)
  *H04L 5/00* (2006.01)
  *H04W 72/0446* (2023.01)
  *H04W 72/0453* (2023.01)
  *H04W 72/541* (2023.01)

(52) U.S. Cl.
  CPC ..... *H04W 72/0453* (2013.01); *H04W 72/541* (2023.01); *H04W 76/11* (2018.02); *H04W 76/15* (2018.02)

(56) References Cited

U.S. PATENT DOCUMENTS

| | | | | |
|---|---|---|---|---|
| 2012/0014333 A1* | 1/2012 | Ji | .................. | H04W 72/27 370/329 |
| 2013/0005378 A1* | 1/2013 | Hasegawa | ............. | H04W 16/06 455/509 |
| 2013/0267230 A1* | 10/2013 | Lin | ................. | H04W 24/02 455/436 |
| 2014/0177531 A1* | 6/2014 | Imamura | ............... | H04L 5/0048 370/328 |
| 2015/0124720 A1 | 5/2015 | Morimoto | | |
| 2015/0349908 A1* | 12/2015 | Centonza | .............. | H04L 5/0035 370/328 |
| 2016/0006529 A1* | 1/2016 | Yi | .................. | H04L 5/0044 370/329 |
| 2016/0095007 A1* | 3/2016 | Tian | .................. | H04L 5/0073 370/252 |
| 2017/0155482 A1* | 6/2017 | Xiong | ................. | H04B 7/022 |
| 2017/0223625 A1* | 8/2017 | Liu | .................... | H04W 64/003 |
| 2018/0255482 A1* | 9/2018 | Song | ................. | H04W 28/16 |

OTHER PUBLICATIONS

RP-171858, Source: Apple, "Single UL transmission support for NR NSA mode UEs" Document for: Decision, Agenda item: 9.2.1, Release: 3GPP TSG RAN Meeting #77, Sep. 11-14, 2017, Sapporo, Japan.

Chinese Office Action related to Application No. 201711149113.8 dated Jan. 7, 2020

* cited by examiner

FIRST STATION, SECOND STATION AND NON-TRANSITORY COMPUTER-READABLE STORAGE MEDIUM

CROSS-REFERENCE TO RELATED APPLICATION

The present disclosure is a continuation application of the U.S. patent application Ser. No. 16/763,172 and titled with "a resource allocation method and device", which is incorporated herein by reference in their entireties.

TECHNICAL FIELD

The present disclosure relates to the field of communication technology, in particular to a resource allocation method and a resource allocation device.

BACKGROUND

In the discussion of New Radio Access Technology (NR) in the fifth generation mobile communication technology (5G) standard, the 5G system and LTE system can be coupled in a dual connectivity (DC) mode to form a dual connection system.

In the dual connection system, 1.8 GHz LTE spectrum and 3.5 GHz 5G spectrum can be used for dual connection, and a User Equipment (UE) can simultaneously transmit signals on the 1.8 GHz uplink and 3.5 GHz uplink.

However, when the UE transmits signals simultaneously on the 1.8 GHz uplink and 3.5 GHz uplink, intermodulation interference will occur between the 1.8 GHz uplink and 3.5 GHz uplink, which affects the signal reception by UE on 1.8 GHz downlink. The second harmonic of the 1.8 GHz uplink signal will also affect the signal reception by UE on 3.5 GHz downlink. That is, intermodulation interference and second harmonic interference will cause self-interference of the UE.

SUMMARY

The present disclosure provides a resource allocation method and a resource allocation device, so as to avoid the self-interference of a UE when the UE accesses a first base station and a second base station at the same time.

In order to achieve the above object, the technical solutions are adopted as follows.

In a first aspect of the present disclosure, a resource allocation method is provided. A UE accesses a first base station and a second base station. The resource allocation method includes: receiving, by the first base station, first information transmitted by the second base station, wherein the first information comprises identification information of the UE, identification information of a first serving cell of the UE, and service frequency of the first serving cell, and the second base station is a serving base station of the first serving cell; and transmitting, if the first base station determines that the UE is self-interfered based on the first information, notification information to the second base station, wherein the notification information is used to negotiate with the second base station to allocate a different resource to the UE.

In this disclosure, the first base station may determine whether the UE is self-interfered based on the first information, and transmit notification information to the second base station after determining that the UE is self-interfered. Since the notification information is used to negotiate with the second base station to allocate a different resource to the UE, the second base station may allocate a different resource to the UE based on the notification information than the resource allocated by the first base station to the UE. Therefore, it may be avoided that the resources used by the UE are the same or partially the same when the UE access the first base station and the second base station at the same time, thereby avoiding the problem of self-interference of the UE.

In a second aspect of the present disclosure, a resource allocation method is provided. A UE accesses a first base station and a second base station. The resource allocation method includes: transmitting, by the second base station, first information to the first base station, wherein the first information includes identification information of the UE, identification information of a first serving cell of the UE, and service frequency of the first serving cell, and the second base station is a serving base station of the first serving cell; receiving, by the second base station, notification information transmitted by the first base station, and the notification information is used to negotiate with the second base station to allocate a different resource to the UE.

In this disclosure, the second base station may receive the notification information from the first base station and allocate a resource to the UE. Since the notification information is used to negotiate with the second base station to allocate a different resource to the UE, the second base station may allocate a different resource to the UE based on the notification information than the resources allocated by the first base station to the UE. Therefore, it may be avoided that the resources used by the UE are the same or partially the same when the UE access the first base station and the second base station at the same time, thereby avoiding the problem of self-interference of the UE.

In a third aspect of the present disclosure, a first base station is provided, and a UE accesses the first base station and a second base station. The first base station includes: a receiving unit, configured to receive first information transmitted by the second base station, wherein the first information includes identification information of the UE, identification information of a first serving cell of the UE, and service frequency of the first serving cell, the second base station is a serving base station of the first serving cell; a determining unit, configured to determine whether the UE is self-interfered based on the first information received by the receiving unit; and a transmitting unit, configured to transmit notification information to the second base station if the determination unit determines that the UE is self-interfered, and the notification information is used to negotiate with the second base station to allocate a different resource to the UE.

It should be noted that each functional unit in the third aspect of the present disclosure is a logical division of the first base station in order to perform the resource allocation method of the first aspect described above. The detailed description and beneficial effects of each functional unit may refer to the first aspect, and will not repeated herein.

In a fourth aspect of the present disclosure, a second base station is provided, and a UE accesses the first base station and the second base station. The second base station includes: a transmitting unit, configured to transmit first information to the first base station, where the first information includes identification information of the UE, identification information of a first serving cell of the UE, and service frequency of the first serving cell, and the second base station is a serving base station of the first serving cell; a receiving unit, configured to receive notification information transmitted by the first base station, and the notification information is used to negotiate with the second base station to allocate a different resource to the UE; and an allocating unit, configured to allocate a resource to the UE based on the notification information.

It should be noted that each functional unit in the third aspect of the present disclosure is a logical division of the second base station in order to perform the resource allocation method of the first aspect described above. The detailed description and beneficial effects of each functional unit may refer to the first aspect, and will not repeated herein.

In a fifth aspect of the present disclosure, a first base station is provided. The first base station includes a processor, a memory, and a computer program stored on the memory and executable on the processor. The processor is configured to execute the computer program so as to implement the resource allocation method in the first aspect.

In a sixth aspect of the present disclosure, a computer-readable storage medium storing therein a computer program is provided, the computer program is executed by a processor so as to implement the resource allocation method in the first aspect.

In a seventh aspect of the present disclosure, a second base station is provided. The second base station includes a processor, a memory, and a computer program stored on the memory and executable on the processor. The processor is configured to execute the computer program so as to implement the resource allocation method in the second aspect.

In an eighth aspect of the present disclosure, a computer-readable storage medium storing therein a computer program is provided, the computer program is executed by a processor so as to implement the resource allocation method in the second aspect.

In a ninth aspect of the present disclosure, a communication system is provided. The communication system includes: a first base station in the third aspect, and a second base station in the fourth aspect.

DETAILED DESCRIPTION

In order to describe the technical solution of embodiments of the present disclosure more clearly, the drawings used in the embodiments of the present disclosure will be briefly introduced below. Obviously, the drawings in the following description are only some embodiments of the present disclosure. Those skilled in the art can also obtain other drawings based on these drawings without creative work.

The terms "first" and "second" in the specification and claims of the present disclosure are used to distinguish different objects, rather than to describe a specific order of these objects. For example, first information and second information are used to distinguish different information, rather than to describe a specific order of the information. In the embodiments of the present disclosure, "a plurality of" means two or more.

The term "and/or" in the embodiments of the present disclosure is merely an association relationship between associated objects, and indicates that there may be three types of relationships. For example, A and/or B may indicate: there is A alone, and there are A and B, there is B alone.

In the embodiments of the present disclosure, the words "exemplary" or "for example" are used as describe examples or illustrations. Any embodiment or design described as "exemplary" or "for example" in the present disclosure should not be construed as more preferred or advantageous over other embodiments or designs. Rather, the use of the words "exemplary" or "for example" is intended to present a relevant concept in a concrete manner.

Embodiments of the present disclosure provide a resource allocation method and device, which can allocate different resources to a UE through negotiation between a first base station and a second base station, to avoid the problem of self-interference of the UE. The resource allocation method and device in the embodiments of the present disclosure can be applied to a process in which a first base station and a second base station allocate different resources to the UE when the UE accesses the first base station and the second base station at the same time.

Figure 1:
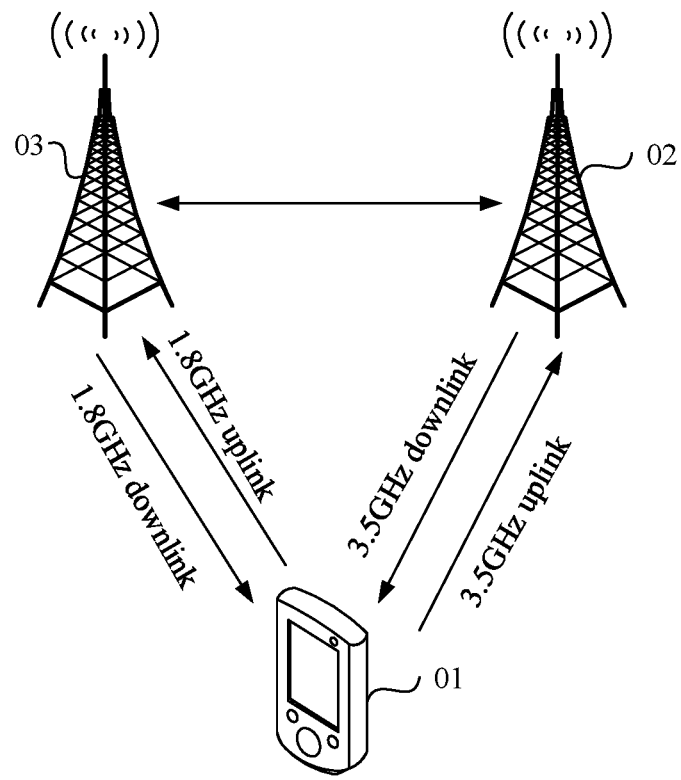
FIG. 1 is a schematic diagram of a system architecture according to an embodiment of the present disclosure.

FIG. 1 shows a schematic diagram of a system architecture according an embodiment of the present disclosure. As shown in FIG. 1, the communication system includes a UE 01, a first base station 02, and a second base station 03. The UE 01 is in communication connection with the first base station 02 and the second base station 03, respectively, and the first base station 02 and the second base station 03 are in communication connection.

The UE 01 accesses the first base station 02 and the second base station 03 at the same time, the first base station 02 is a master base station of the UE 01, and the second base station 03 is a secondary base station of the UE 01.

The first base station 02 and the second base station 03 are both a device deployed in the wireless access network to provide the wireless communication function for the UE 01. The first base station 02 and the second base station 03 may include various forms of macro base stations, micro base stations, relay stations, access points, and so on. In systems using different wireless access technologies, the devices having the functions of the first base station 02 or the second base station 03 may have different names. As the communication technology evolves, the name "base station" may change.

Exemplarily, the first base station 02 in the embodiment of the present disclosure may be an NR base station in the 5G system; the second base station 03 may be an evolved base station (evolved NodeB, eNB, or eNodeB) in the LTE system, or a Node B in the 3G system.

Exemplarily, as shown in FIG. 1, the UE 01 implements information interaction on link (uplink and downlink) of 3.5 GHz service frequency of the first base station 02 and the link (uplink and downlink) of 1.8 GHz service frequency of the second base station 03.

Figure 2:
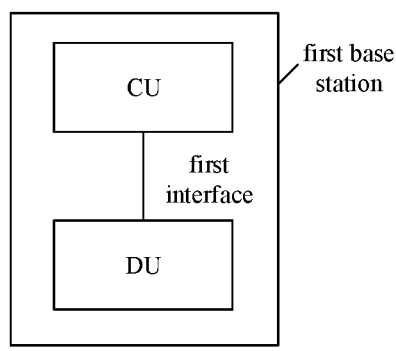
FIG. 2 is a schematic structural diagram of a first base station according to an embodiment of the present disclosure.

FIG. 2 shows a schematic structural diagram of a first base station according to an embodiment of the present disclosure. As shown in FIG. 2, the first base station 02 includes a centralized unit (CU) and a distributed unit (DU). The CU and the DU are in communication connection through the first interface, and the first interface is the interface between the CU and the DU.

The CU may have a non-real-time wireless high-level protocol stack function, which may be used to receive signals from the second base station, and may also support downward compatibility of some core network functions and the deployment of edge application services; DU may have a physical layer processing functions and a Layer 2 function for real-time requirements.

Figure 3:
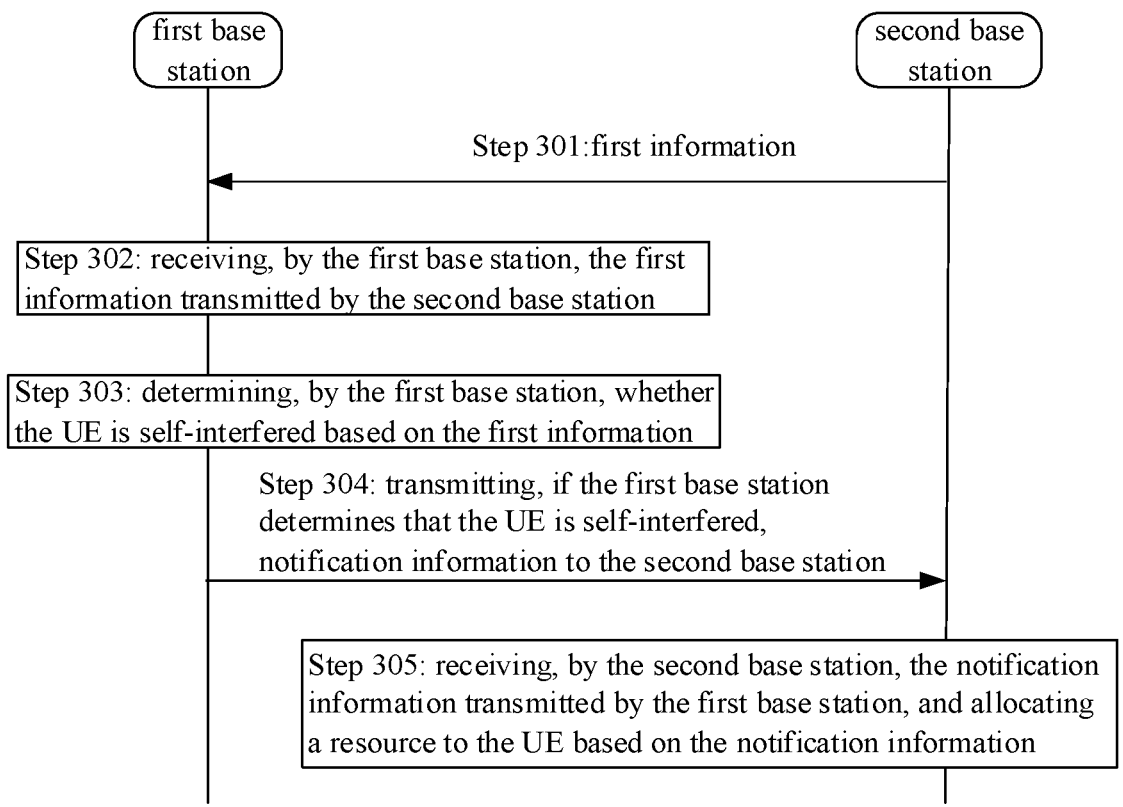
FIG. 3 is a flowchart of a resource allocation method according to an embodiment of the present disclosure.

In the embodiment of the present disclosure, based on the system shown in FIG. 1 and the first base station shown in FIG. 2, an embodiment of the present disclosure provides a resource allocation method. The method introduces the interactive process between the first base station and the second base station in detail. Specifically, as shown in FIG. 3, the resource allocation method includes steps 301 to 305.

Step 301: transmitting, by a second base station, first information to a first base station.

The first information includes identification information of the UE, identification information of a first serving cell of the UE, and service frequency of the first serving cell, and the second base station is the serving base station of the first serving cell.

Exemplarily, the identification information of the UE may uniquely identify the UE, the identification information of the first serving cell of the UE may uniquely identify the first serving cell where the UE is located, and the service frequency of the first serving cell may be 1.8 GHz.

Figure 4:
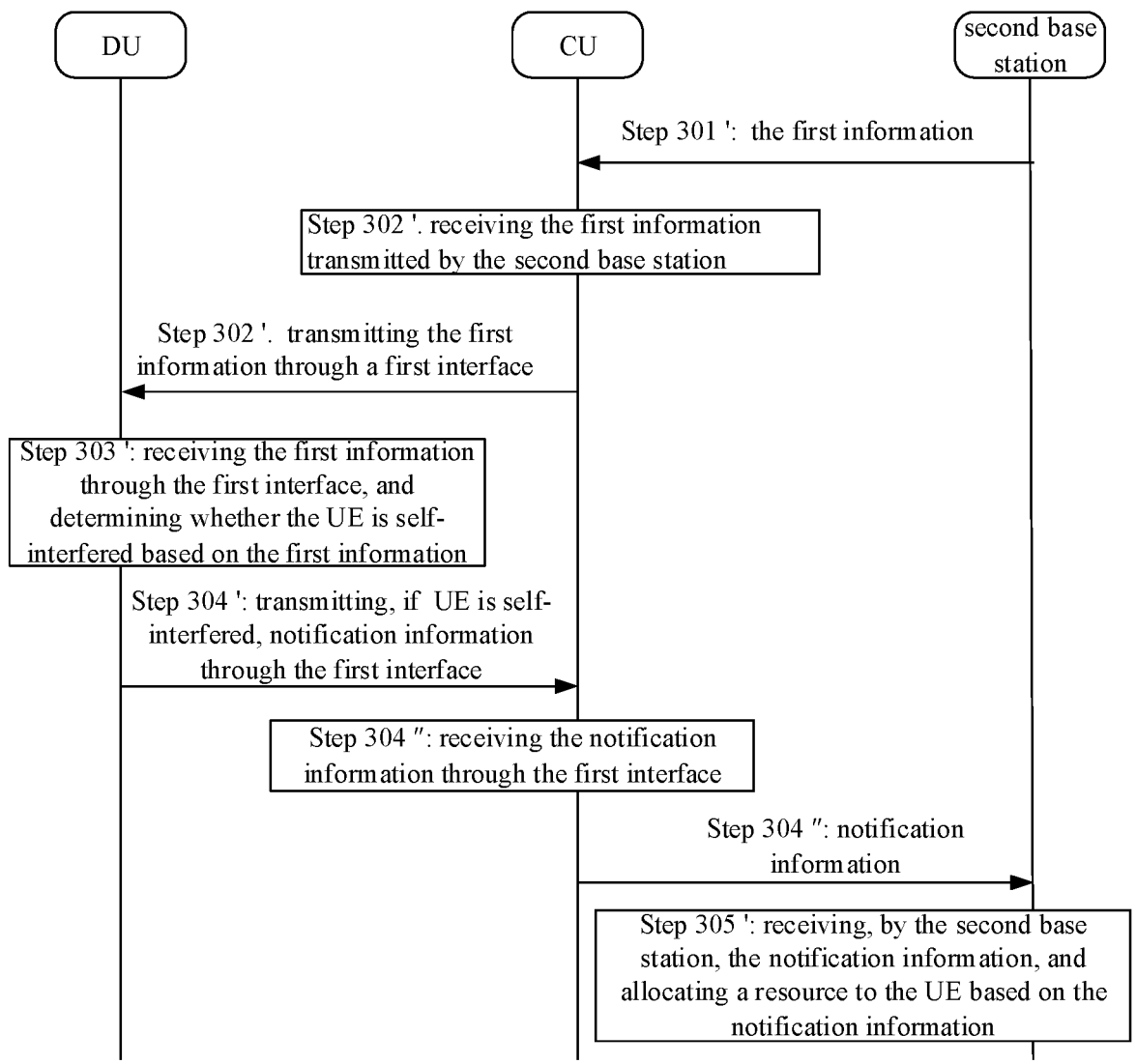
FIG. 4 is another flowchart of a resource allocation method according to an embodiment of the present disclosure.

Optionally, in the embodiment of the present disclosure, with reference to FIG. 3 and as shown in FIG. 4, the above step 301 may be implemented by step 301'.

Step 301': transmitting, by the second base station, the first information to CU.

The first base station receives the first information transmitted by the second base station through the CU.

Step 302: receiving, by the first base station, the first information transmitted by the second base station.

Optionally, in the embodiment of the present disclosure, with reference to FIG. 3 and as shown in FIG. 4, the above step 302 may specifically be implemented by step 302'.

Step 302': receiving, by the CU, the first information transmitted by the second base station and transmitting the first information to DU through a first interface.

The first interface is an interface between the CU and the DU of the first base station.

Step 303: determining, by the first base station, whether the UE is self-interfered based on the first information.

The first base station may determine whether the UE is self-interfered according to the service frequency of the first serving cell and a service frequency of a second serving cell, and the first base station is the serving base station of the second serving cell.

Exemplarily, the serving frequency of the second serving cell may be 3.5 GHz.

Optionally, in the embodiment of the present disclosure, with reference to FIG. 3 and as shown in FIG. 4, the above step 303 may be implemented by step 303'.

Step 303': receiving, by the DU, the first information through the first interface, and determining whether the UE is self-interfered based on the first information.

Step 304: transmitting, if the first base station determines that the UE is self-interfered, notification information to the second base station.

The notification information is used to negotiate with the second base station to allocate different resources to the UE.

Optionally, in the first implementation of the embodiment of the present disclosure, the notification information may include second information, and the second information is used to instruct the second base station to allocate resources different from the first resources to the UE. The second information includes the identification information of the UE, the identification information of the second serving cell of the UE, the first resource allocated by the first base station to the UE, and the first base station is the serving base station of the second serving cell.

Exemplarily, the first resource in the embodiment of the present disclosure is a resource allocated by the first base station and used by the UE when the UE is self-interfered.

Optionally, the resources in the embodiments of the present disclosure may include at least one of the following resources: a time slot, a half time slot, a sub-frame, a frame, a physical resource block (PRB), a PRB group, and Bandwidth Part (BWP).

Optionally, the notification information in the first implementation of the embodiment of the present disclosure may further include first indication information, where the first indication information is used to instruct the second base station to allocate resources different from the first resource to the UE.

Exemplarily, the first resource allocated by the first base station to the UE is PRB1, and the first indication information is used to instruct the second base station to allocate resources different from PRB1 to the UE.

Optionally, in a second implementation of the embodiment of the present disclosure, the notification information may include information of a second resource, and the information of the second resource is used to instruct the second base station to allocate the second resource to the UE, and the second resource and the first resource are different, and the first resource is a resource allocated by the first base station to the UE.

Exemplarily, the second base station may allocate the second resource to the UE according to the indication of the information of the second resource; or, the second base station may not allocate the second resource to the UE after receiving the information of the second resource.

Exemplarily, the second resource is a resource that the first base station indicates the second base station to use. Assume that the first resource allocated by the first base station to the UE is PRB1. The information of second resource is used to indicate that the second resource allocated by the second base station to the UE is PRB2. The second base station may allocate PRB2 to the UE based on the indication of the information of the second resource; or, after receiving the information of the second resource, the second base station does not allocate PRB2 to the UE.

Exemplarily, the notification information in the second implementation of the embodiment of the present disclosure may also be second information. The second information is used to instruct the second base station to allocate a resource different from first resource to the UE when it is determined that the second source is not allocated to the UE.

Exemplarily, the cases where the second base station does not allocate the second resource to the UE may be: the second resource is unavailable; the second base station does not allocate the second resource to the UE; or the second resource is available, but the second base station does not allocate the second resource to the UE.

Optionally, in the embodiment of the present disclosure, the notification information may further include a start use time and a stop use time of the first resource.

Optionally, in the embodiment of the present disclosure, the notification information may further include second indication information.

The second indication information is used to indicate that the first resource is a dedicated resource of the UE (the dedicated resource refers to a resource used only by the UE); or, the second indication information is used to indicate that the first resource is a common resource of N UEs (the common resource refers to a resource that are commonly used by a plurality of UEs). N UEs include the above-mentioned UE, the N UEs are all located in the second serving cell of the above-mentioned UE, and N is a positive integer greater than or equal to 2.

Optionally, in the embodiment of the present disclosure, with reference to FIG. 3 and as shown in FIG. 4, the above step 304 may specifically be implemented by step 304' and step 304".

Step 304': transmitting, if the DU determines that the UE is self-interfered, notification information to the CU through the first interface.

Step 304": receiving, by the CU, the notification information through the first interface and transmitting the notification information to the second base station.

Optionally, in the embodiments of the present disclosure, the above 304 may also specifically be implemented through 304a and 304b.

304a. transmitting, by the DU, the second information to the CU through the first interface. The second information includes the identification information of the UE, the identification information of the second serving cell of the UE, the first resource allocated by the first base station to the UE, and the first base station is the serving base station of the second serving cell.

304b. receiving, by the CU, the second information through the first interface, and transmitting notification information to the second base station based on the second information.

Step 305: receiving, by the second base station, the notification information transmitted by the first base station, and allocating a resource to the UE based on the notification information.

The second base station may allocate different resource to the UE based on the notification information than the resource allocated by the first base station to the UE.

Optionally, in the embodiment of the present disclosure, with reference to FIG. 3 and as shown in FIG. 4, the above step 305 may specifically be implemented by step 305'.

Step 305': receiving, by the second base station, notification information transmitted by the CU, and allocating a resource to the UE based on the notification information.

Figure 5:
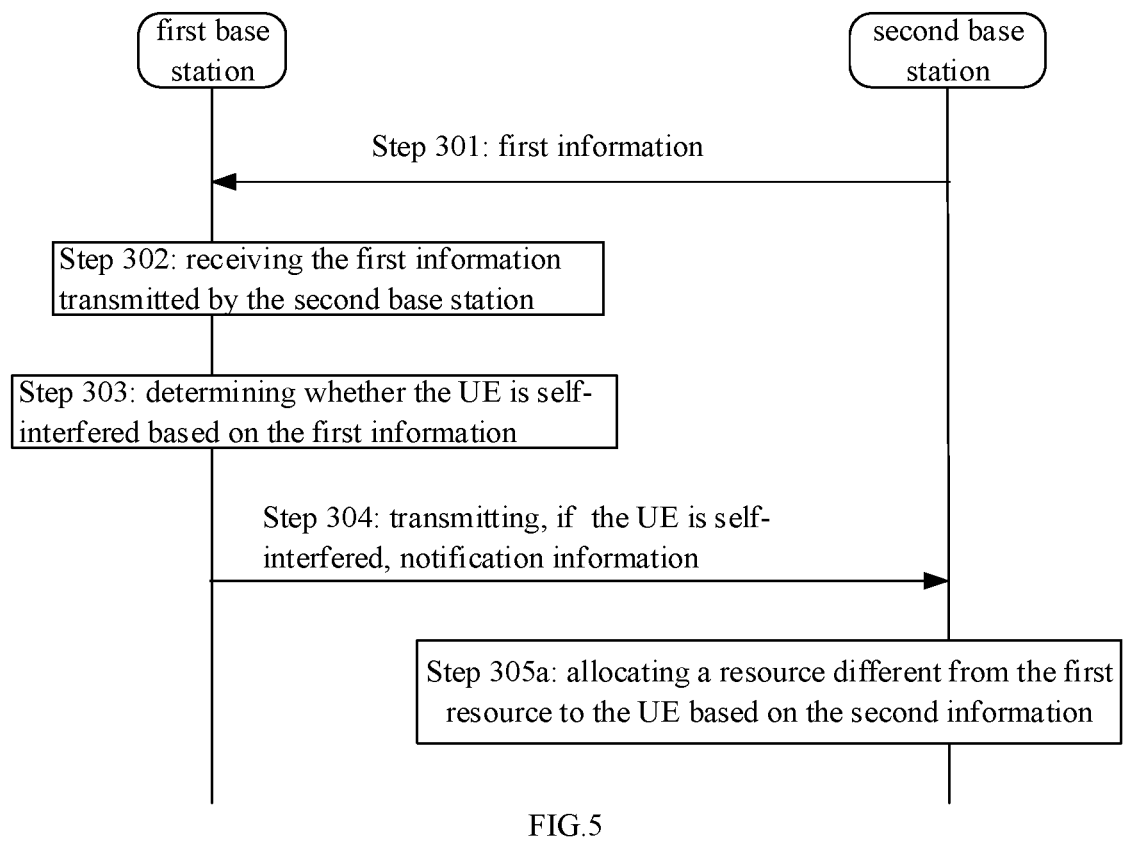
FIG. 5 is yet another flowchart of a resource allocation method according to an embodiment of the present disclosure.

Optionally, when the notification information includes second information used to instruct the second base station to allocate the resource different from the first resource to the UE, referring to FIG. 3, as shown in FIG. 5, the above step 305 is implemented by step 305a.

Step 305a: allocating, by the second base station, a resource different from the first resource to the UE based on the second information.

Exemplarily, the second base station acquires the first resource allocated by the first base station to the UE as PRB1 based on the information of the first resource allocated by the first base station to the UE, and the second base station allocates a resource different from PRB1 (such as PRB2).

Figure 6:
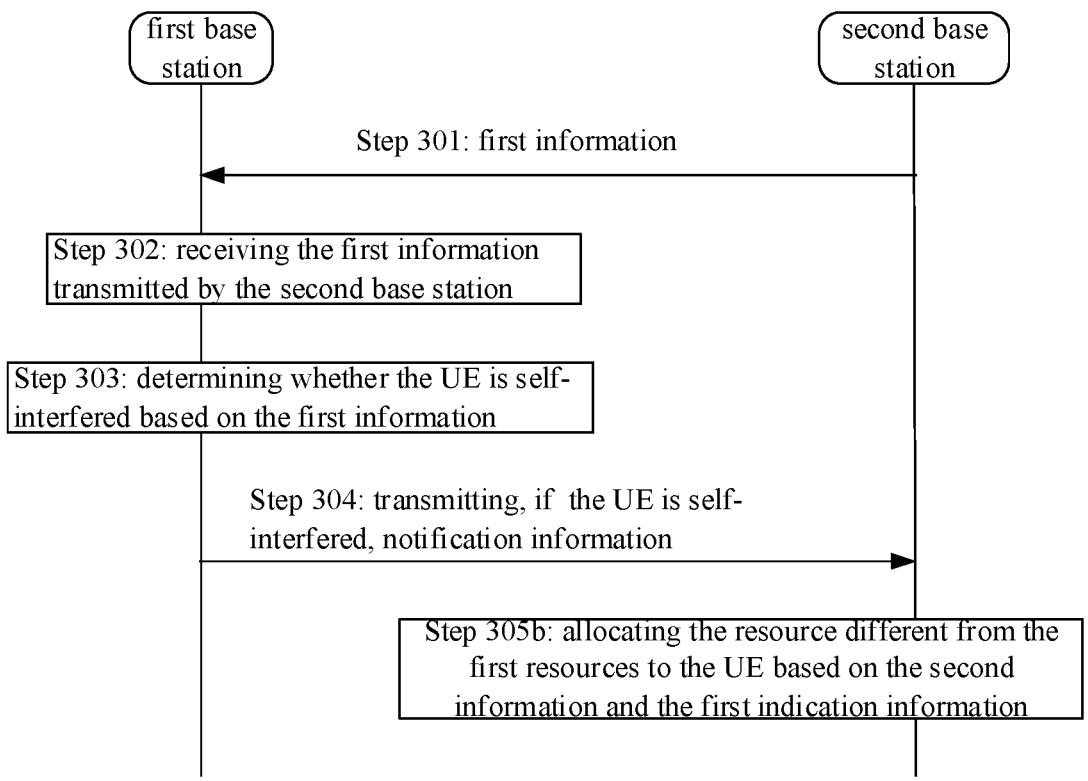
FIG. 6 is still yet another flowchart of a resource allocation method according to an embodiment of the present disclosure.

Optionally, when the notification information includes second information and first indication information, the second information is used to instruct the second base station to allocate the resource different from the first resource to the UE, with reference to FIG. 3, as shown in FIG. 6, the above step 305 can be specifically implemented through step 305b.

Step 305b: allocating, by the second base station, the resource different from the first resources to the UE based on the second information and the first indication information.

The first indication information is used to instruct the second base station to allocate the resource different from the first resource to the UE.

Exemplarily, the second base station acquires the first resource allocated to the UE by the first base station as PRB1, and the second base station allocates the resource different from PRB1 (such as PRB2) to the UE based on the indication of the first indication information.

Figure 7:
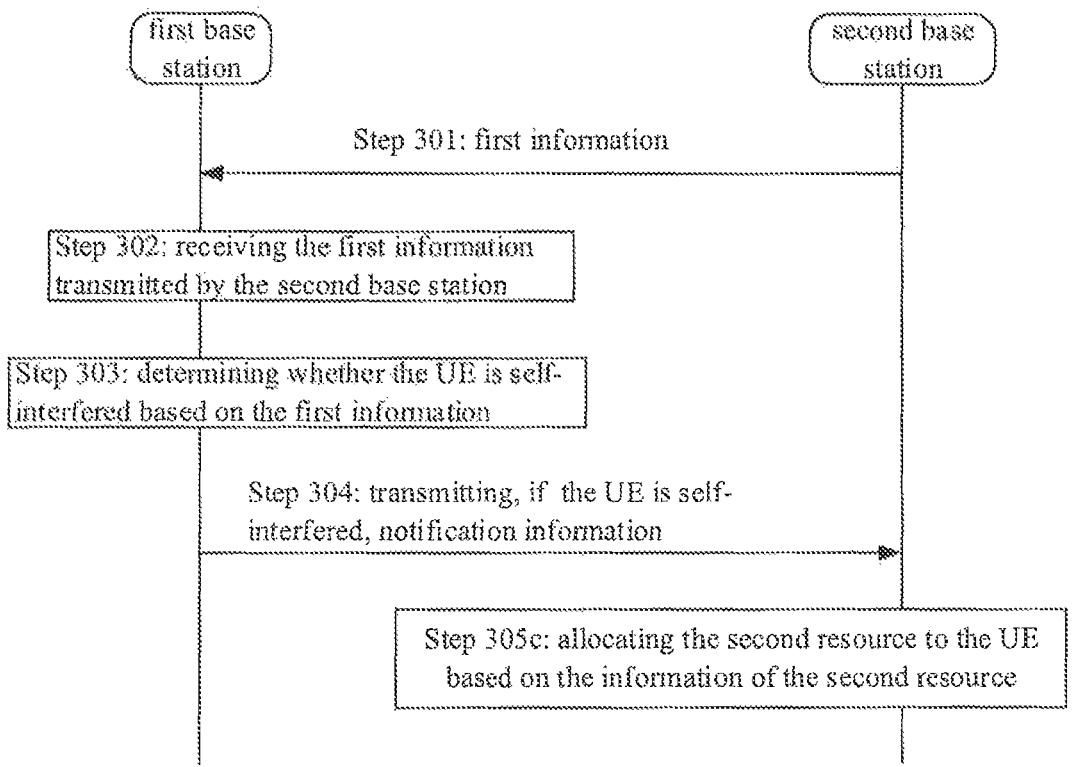
FIG. 7 is still yet another flowchart of a resource allocation method according to an embodiment of the present disclosure.

Optionally, in the case where the notification information includes information of the second resource, with reference to FIG. 3 and as shown in FIG. 7, the above step 305 may specifically be implemented by step 305c.

Step 305c: allocating, by the second base station, the second resource to the UE based on the information of the second resource.

The information of the second resource is used to instruct the second base station to allocate the second resource to the UE. The second resource is different from the first resource, and the first resource is the resource allocated by the first base station to the UE.

Exemplarily, assume that the first resource allocated by the first base station to the UE is PRB1. The information of the second resource transmitted by the first base station to the second base station indicates that the second resource allocated by the second base station to the UE is PRB2, and the second base station allocates PRB2 to the UE based on the indication of the second resource information.

Figure 8:
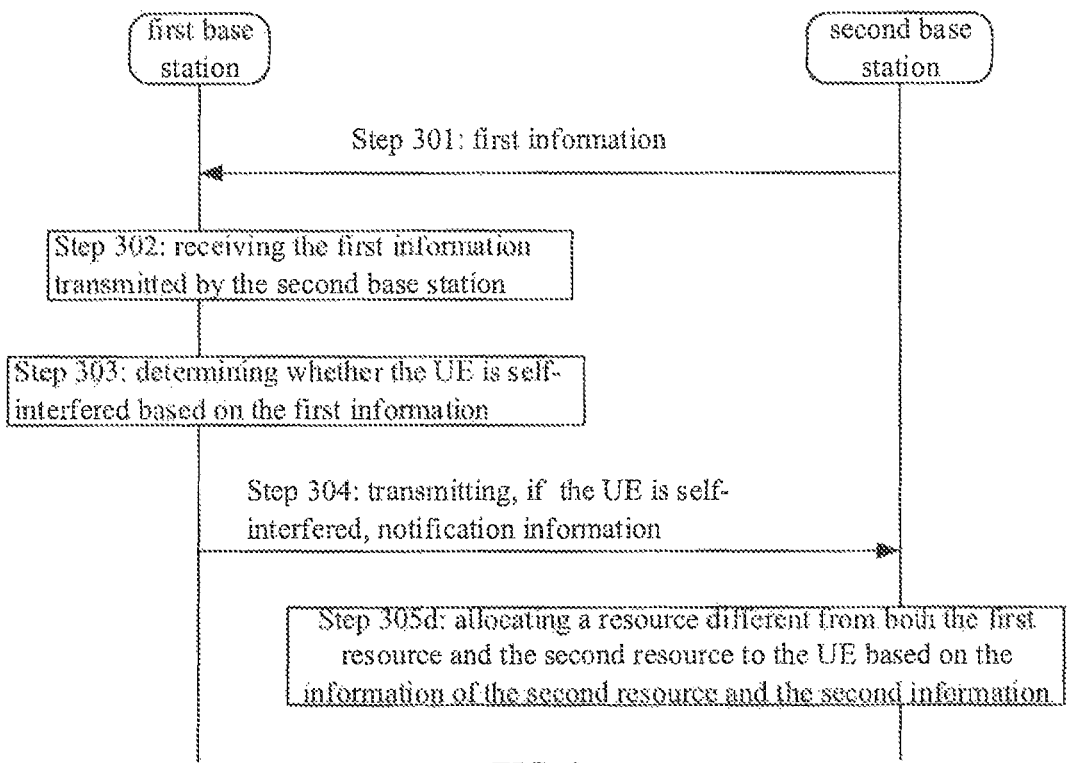
FIG. 8 is still yet another flowchart of a resource allocation method according to an embodiment of the present disclosure.

Optionally, the notification information includes information of the second resource and second information, and the second information is used to instruct the second base station to allocate a resource different from the first resource to the UE when it is determined that the second resource is not to allocated to the UE. Referring to FIG. 3, as shown in FIG. 8, the above step 305 may be specifically implemented through step 305d.

Step 305d: allocating, by the second base station, a resource different from both the first resource and the second resource to the UE based on the information of the second resource and the second information.

After receiving the information of the second resource, the second base station does not allocate the second resource to the UE based on the indication of the information of the second resource, but allocates a resource different from the first resource and the second resource to the UE based on the information of the first resource allocated to the UE by the first base station.

Exemplarily, the information of the second resource indicates the second resource PRB2 allocated by the second base station to the UE, and the second base station obtains the first resource as PRB1 based on the information of the first resource allocated by the first base station to the UE, and the second base station allocates a resource PRB3 different from both PRB1 and PRB2 to the UE.

Optionally, in the embodiment of the present disclosure, after the above step 305, the resource allocation method in the embodiments of the present disclosure may further include 306 and 307.

306: transmitting, by the second base station, a response message to the first base station. The response message is used to indicate the resource allocated by the second base station to the UE.

Exemplarily, the first resource allocated by the first base station to the UE is PRB1, the resource allocated by the second base station to the UE is PRB2, and the second base station transmitted a response message to the first base station, the response message includes the resource PRB2 allocated by the second base station to the UE.

307: receiving, by the first base station, the response message transmitted by the second base station. The first base station may allocate a resource to the UE according to the response message.

Optionally, in the embodiment of the present disclosure, the first base station may allocate a resource to the UE based on the response message. Specifically, the CU may transmit resource indication information to the DU through the first interface based on the response message, the DU receives the resource indication information through the first interface, and allocate a resource to the UE based on the resource indication information. The resource indication information is used to indicate the DU to allocate a different resources to the UE than the resource allocated to the UE by the second base station. The resource indication information includes the identification information of the UE, the identification information of the second serving cell of the UE, and the resource allocated by the second base station to the UE.

Exemplarily, the first resource allocated by the first base station to the UE is PRB1, the resource allocated by the second base station to the UE is PRB2, and the second base station transmits a response message containing the resource PRB2 allocated by the second base station to the UE to the first base station, the first base station allocates PRB1 or PRB3 each of which is different from PRB2 to the UE.

An embodiment of the present disclosure provides a resource allocation method. The first base station may determine whether the UE is self-interfered based on the first information, and transmits notification information to the second base station after determining that the UE is self-interfered. Since the notification information is used to negotiate with the second base station to allocate different resources to the UE, the second base station may allocate a different resource to the UE according to the notification information than the resource allocated by the first base station to the UE; therefore, it may be avoided that the resources used by the UE to access the first base station and the second base station at the same time are the same or partially the same, thereby avoiding the problem of self-interference of UE.

Further, the resource allocation method provided by the embodiments of the present disclosure ensures that the UE can accurately and stably receive signals from the first base station and the second base station when the UE accesses the first base station and the second base station at the same time.

Figure 9:
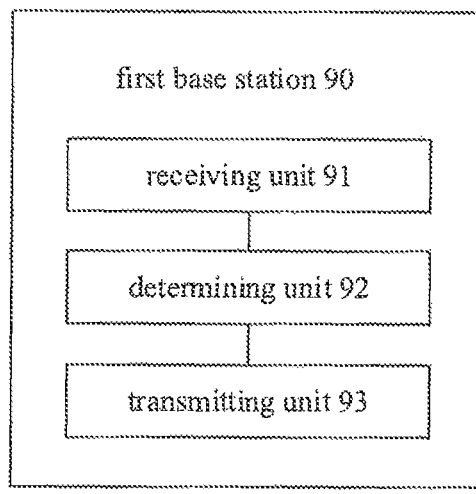
FIG. 9 is a schematic structural diagram of a first base station according to an embodiment of the present disclosure.

In an embodiment of the present disclosure, FIG. 9 shows a possible structural schematic diagram of the first base station according to an embodiment of the present disclosure. As shown in FIG. 9, the first base station 90 may include: a receiving unit 91, a determining unit 92 and a transmitting unit 93.

The receiving unit 91 is configured to receive the first information transmitted by the second base station. The first information includes the identification information of the UE, the identification information of the first serving cell of the UE, and the service frequency of the first serving cell. The second base station is a serving base station of the first serving cell.

The determining unit 92 is configured to determine whether the UE is self-interfered based on the first information received by the receiving unit 91.

The transmitting unit 93 is configured to transmit notification information to the second base station if the determination unit 92 determines that the UE is self-interfered, and the notification information is used to negotiate with the second base station to allocate a different resource to the UE.

In a possible implementation, the receiving unit 91 is further configured to receive a response message transmitted by the second base station after the transmitting unit 93 transmits the notification information to the second base station, and the response message is used to indicate the resource allocated by the second base station to the UE.

In a possible implementation, the first base station includes CU and DU. The CU is used to receive the first information transmitted by the second base station and transmit the first information to the DU through the first interface, where the first interface is an interface between the CU and the DU.

In a possible implementation, the DU is used to receive the first information through the first interface, and determine the self-interference of the UE based on the first information.

In a possible implementation, the DU is also used to transmit the notification information to the CU through the first interface. The CU is also used to receive the notification information through the first interface and transmit the notification information to the second base station.

In a possible implementation, the DU is also used to transmit second information to the CU through the first interface; where the second information includes identification information of the UE, identification information of the second serving cell of the UE, and the first resource allocated by the first base station to the UE, the first base station is the serving base station of the second serving cell. The CU is also used to receive the second information through the first interface and transmit the notification information to the second base station based on the second information.

In a possible implementation, the CU is also used to, after receiving the response message transmitted by the second base station, transmit resource indication information to the DU through the first interface based on the response message, where the resource indication information is used to instruct the DU to allocate a different resource to the UE than the resource allocated by the second base station to the UE. The resource indication information includes the identification information of the UE, the identification information of the second serving cell of the UE, and the resource allocated by the second base station to the UE. The DU is also used to receive resource indication information through the first interface and allocate a resource to the UE based on the resource indication information.

In a possible implementation, the notification information includes second information that is used to instruct the second base station to allocate resources different from the first resource to the UE, where the second information includes identification information of the UE, and identification information of the second serving cell and the first resource allocated by the first base station to the UE, the first base station is the serving base station of the second serving cell.

In a possible implementation, the notification information further includes first indication information, which is used to instruct the second base station to allocate a resource different from the first resource to the UE.

In a possible implementation, the notification information includes information of the second resource, and the information of the second resource is used to instruct the second base station to allocate the second resource to the UE, the second resource is different from the first resource, and the first resource is the resource allocated by the first base station to the UE.

In a possible implementation, the notification information further includes second information, and the second information is used to instruct the second base station to allocate a resource different from the first resource to the UE if it determined that the second source is not allocated to the UE. The second information includes the identification information of the UE, the identification information of the second serving cell of the UE, the first resource allocated by the first base station to the UE, and the first base station is the serving base station of the second serving cell.

In a possible implementation, the notification information further includes a start use time and a stop use time of the first resource.

In a possible implementation, the notification information further includes second indication information, which is used to indicate that the first resource is a dedicated resource of the UE; or, is used to indicate that the first resource is a common resource of N UEs. The N UEs include the foregoing UE, and the N UEs are all in the second serving cell of the foregoing UE, and N is a positive integer greater than or equal to 2.

In a possible implementation, the resource includes at least one of the following resources: a time slot, a half time slot, a sub-frame, a frame, PRB, a PRB group, and BWP.

In a possible implementation, the first base station is a master serving base station of the UE.

The first base station 90 in the embodiment of the present disclosure can implement various processes implemented by the first base station in the method embodiments of FIG. 3 to FIG. 8. To avoid repetition, detailed descriptions and beneficial effects are not repeated herein.

Figure 10:
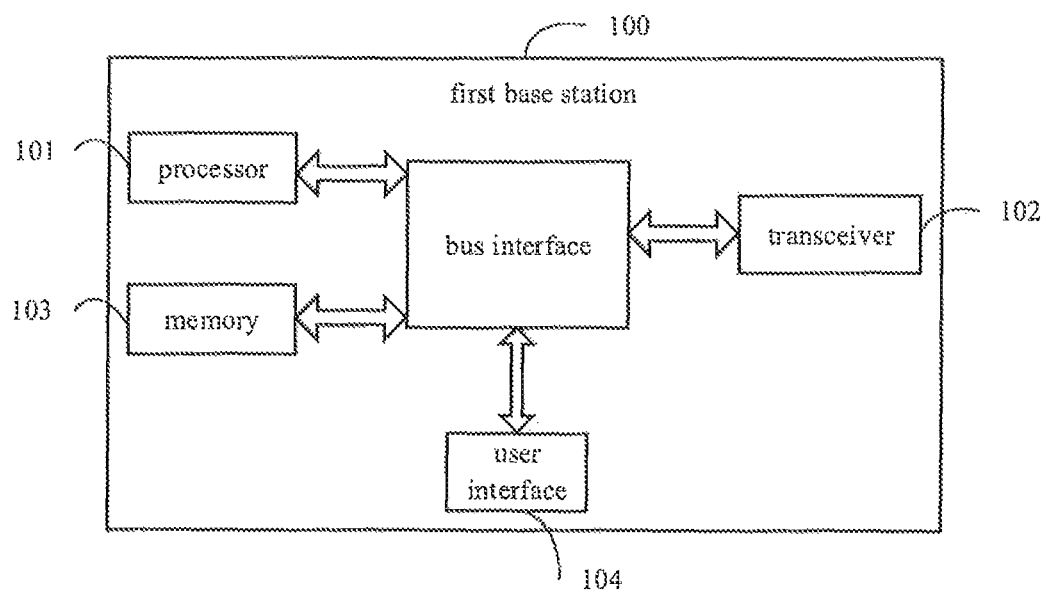
FIG. 10 is a schematic diagram of a hardware structure of a first base station according to an embodiment of this disclosure.

FIG. 10 is a schematic diagram of a hardware structure of a first base station that implements various embodiments of the present disclosure. The first base station 100 includes a processor 101, a transceiver 102, a memory 103, a user interface 104, and a bus interface.

It should be noted that those skilled in the art may understand that the structure of the first base station shown in FIG. 10 does not constitute a limitation on the first base station, and the first base station may include more or fewer components than those shown in FIG. 10. Different components may be combined or arranged in different ways.

The processor 101 is configured to perform the following steps: receiving the first information transmitted by the second base station; transmitting, if the first base station determines the self-interference of the UE based on the first information, notification information to the second base station. The notification information is used to allocate a different resource to the UE by negotiating with the second base station. The first information includes the identification information of the UE, the identification information of the first serving cell of the UE and the service frequency of the first serving cell, and the second base station is the serving base station of the first serving cell.

The transceiver 102 is used to receive the first information from the second base station; and send the notification information to the second base station.

In the embodiment of the present disclosure, in FIG. 10, the bus architecture may include any number of interconnected buses and bridges, one or more processors represented by the processor 101 and the memory represented by the memory 103 are linked together. The bus architecture can also link various other circuits such as peripheral devices, voltage regulators, and power management circuits, etc., which are known in the art, and therefore, they will not be further described herein. The bus interface provides an interface.

The transceiver 102 may be a plurality of elements, including a transmitter and a receiver, and provides a unit for communicating with various other devices on a transmission medium. For different UEs, the user interface 104 may also be an interface that can be externally or internally connected to the required device. The connected devices include but are not limited to a keypad, a display, a speaker, a microphone, a joystick, and the like.

The memory 103 can be used to store software programs and various data. The memory 103 may mainly include a program storage area and a data storage area, the program storage area may store an operating system and application programs required by at least one function (such as a sound playback function, an image playback function, etc.); the data storage area may store data created by the use of mobile phones (such as audio data, phone books, etc.) In addition, the memory 103 may include a high-speed random access memory, and a non-volatile memory, such as at least one of a magnetic disk storage device, a flash memory device, or other volatile solid-state storage device.

The processor 101 is the control center of the first base station, used to connect various parts of the entire first base station through various interfaces and lines, run or execute the software programs and/or modules stored in the memory 102, and call data stored in the memory 103, to perform various functions of the first base station and process data, so as to perform overall monitoring of the first base station. The processor 101 may include one or more processing units; optionally, the processor 101 may integrate an application processor and a modem processor. The application processor mainly processes an operating system, a user interface, and application programs, etc. The modem processor mainly processes wireless communication. It can be understood that the foregoing modem processor may not be integrated into the processor 101.

In addition, the first base station 100 includes some functional modules not shown, which will not be repeated herein.

Optionally, an embodiment of the present disclosure further provides a first base station, including a processor 101, a memory 103, and a computer program stored on the memory 103 and executable on the processor 101, when the computer program is executed by the processor 101, various processes of the method embodiments in any one of the above-mentioned FIGS. 3 to 8 are realized, and the same technical effect can be achieved. In order to avoid repetition, they are not repeated herein.

Figure 11:
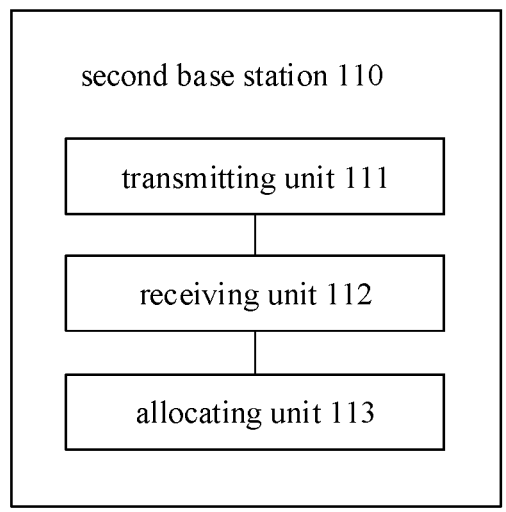
FIG. 11 is a schematic structural diagram of a second base station according to an embodiment of the present disclosure.

In an embodiment of the present disclosure, FIG. 11 shows a possible structural schematic diagram of a second base station in an embodiment of the present disclosure. As shown in FIG. 11, the second base station 110 may include: a transmitting unit 111, a receiving unit 112 and an allocating unit 113.

The transmitting unit 111 is configured to transmit first information to the first base station, where the first information includes the identification information of the UE, the identification information of the first serving cell of the UE, and the service frequency of the first serving cell, and the second base station is the serving base station of the first serving cell.

The receiving unit 112 is configured to receive notification information transmitted by the first base station, and the notification information is used to negotiate with the second base station to allocate a different resource to the UE.

The allocating unit 113 is configured to allocate resources to the UE based on the notification information.

In a possible implementation, the transmitting unit 111 is further configured to transmit a response message to the first base station after the allocating unit 113 allocates a resource to the UE based on the notification information, where the response message is used to indicate the resource allocated by the second base station to the UE.

In a possible implementation, the notification information includes second information that is used to instruct the second base station to allocate a resource different from the first resource to the UE, where the second information includes identification information of the UE, and the identification information of the second serving cell and the first resource allocated by the first base station to the UE, the first base station is the serving base station of the second serving cell. Correspondingly, the allocating unit 113 is specifically configured to allocate a resource different from the first resources to the UE based on the second information.

In a possible implementation, the notification information further includes first indication information, and the first indication information is used to instruct the second base station to allocate a resource different from the first resources to the UE. Correspondingly, the allocating unit 113 is specifically configured to allocate a resource different from the first resources to the UE based on the first indication information.

In a possible implementation, the notification information includes information of the second resource, and the information of the second resource is used to instruct the second base station to allocate the second resource to the UE, the second resource is different from the first resource, and the first resource is the resource allocated by the first base station to the UE. Correspondingly, the allocating unit 113 is specifically configured to allocate the second resource to the UE based on the information of the second resource.

In a possible implementation, the notification information further includes second information, and the second information is used to instruct the second base station to allocate a resource different from the first resource to the UE if it determined that the second resource is not allocated to the UE is not to allocated to the UE, the second information includes the identification information of the UE, the identification information of the second serving cell of the UE, the first resource allocated by the first base station to the UE, and the first base station is the serving base station of the second serving cell. Correspondingly, the allocating unit 113 is specifically configured to allocate a resource different from both the first resource and the second resource to the UE based on the second information.

In a possible implementation, the notification information further includes a start use time and a stop use time of the first resource.

In a possible implementation, the notification information further includes second indication information; the second indication information is used to indicate that the first resource is a dedicated resource of the UE, or used to indicate that the first resource is a common resource of N UEs. The N UEs include the foregoing UE, and the N UEs are all in the second serving cell of the foregoing UE, and N is a positive integer greater than or equal to 2.

In a possible implementation, the resource includes at least one of the following resources: a time slot, a half time slot, a sub-frame, a frame, PRB, a PRB group, and BWP.

In a possible implementation, the second base station is a secondary serving base station of the UE.

The second base station 110 provided in the embodiment of the present disclosure can implement various processes implemented by the second base station in the method embodiments of FIG. 3 to FIG. 8. To avoid repetition, detailed descriptions and beneficial effects are not repeated herein.

Figure 12:
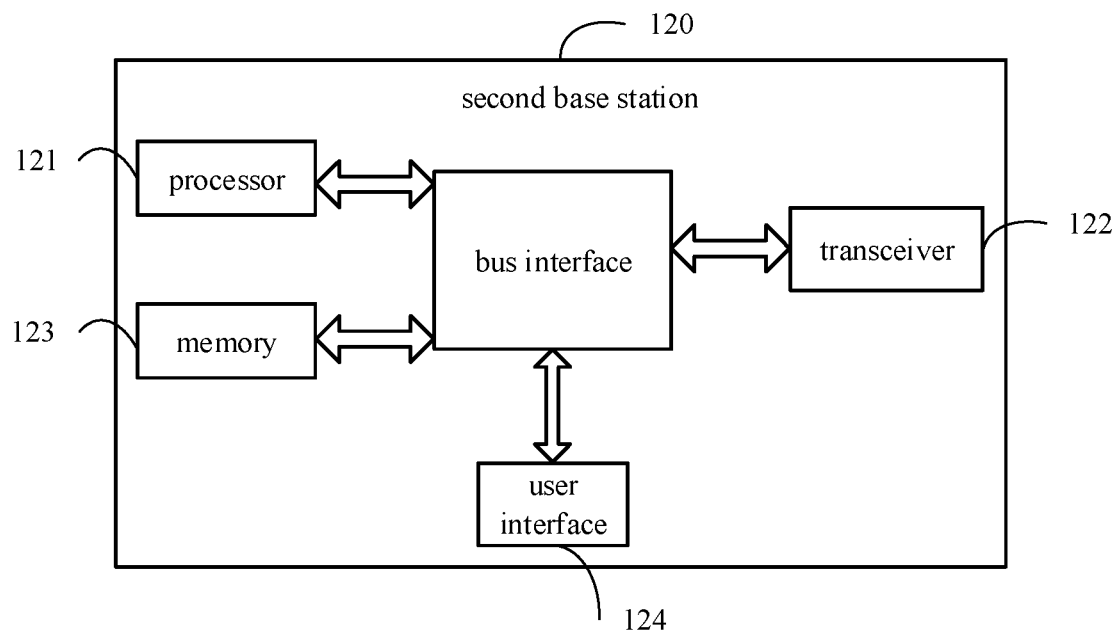
FIG. 12 is a schematic diagram of a hardware structure of a second base station according to an embodiment of the present disclosure.

FIG. 12 is a schematic diagram of a hardware structure of a second base station according to an embodiments of the present disclosure. The second base station 120 includes but is not limited to: a processor 121, a transceiver 122, a memory 123, a user interface 124, and a bus interface.

It should be noted that those skilled in the art can understand that the structure of the second base station shown in FIG. 12 does not constitute a limitation on the second base station, and the second base station may include more or fewer components than those shown in FIG. 12, Different components may be combined or arranged in different ways.

The processor 121 is used to perform the following steps: transmitting the first information to the first base station; receiving notification information transmitted by the first base station. The notification information is used to allocate a different resource to the UE by negotiating with the second base station. The first information includes the identification information of the UE, the identification information of the first serving cell of the UE and the service frequency of the first serving cell, and the second base station is the serving base station of the first serving cell.

The transceiver 122 is used to transmit the first information to the first base station; and receive the notification information transmitted by the first base station.

In the embodiment of the present disclosure, in FIG. 12, the bus architecture may include any number of interconnected buses and bridges, one or more processors represented by the processor 121 and memory represented by the memory 123 are linked together. The bus architecture can also link various other circuits such as peripheral devices, voltage regulators, and power management circuits, etc., which are known in the art, and therefore, they will not be further described herein. The bus interface provides an interface.

The transceiver 122 may be a plurality of elements, including a transmitter and a receiver, and provides a unit for communicating with various other devices on a transmission medium. For different UEs, the user interface 124 may also be an interface that can be externally or internally connected to the required equipment. The connected equipment includes but is not limited to a keypad, a display, a speaker, a microphone, a joystick, and the like.

The memory 123 may be used to store software programs and various data. The memory 123 may mainly include a program storage area and a data storage area, the program storage area may store an operating system and application programs required by at least one function (such as a sound playback function, an image playback function, etc.); the data storage area may store data created by the use of mobile phones (such as audio data, phone books, etc.) In addition, the memory 123 may include a high-speed random access memory, and a non-volatile memory, such as at least one of a magnetic disk storage device, a flash memory device, or other volatile solid-state storage device.

The processor 121 is the control center of the first base station, used to connect various parts of the entire first base station through various interfaces and lines, run or execute the software programs and/or modules stored in the memory 122, and call data stored in the memory 123, to perform various functions of the first base station and process data, so as to perform overall monitoring of the first base station. The processor 121 may include one or more processing units; optionally, the processor 121 may integrate an application processor and a modem processor. The application processor mainly processes an operating system, a user interface, and application programs, etc. The modem processor mainly processes wireless communication. It can be understood that the foregoing modem processor may not be integrated into the processor 121.

In addition, the second base station 120 includes some functional modules, which will not be repeated herein.

Optionally, an embodiment of the present disclosure further provides a second base station, including a processor 121, a memory 123, and a computer program stored on the memory 123 and executable on the processor 121, when the computer program is executed by the processor 121, various processes of the method embodiments in any one of the above-mentioned FIGS. 3 to 8 are realized, and the same technical effect can be achieved. In order to avoid repetition, they are not repeated herein.

Embodiments of the present disclosure also provide a computer-readable storage medium, and a computer program is stored on the computer-readable storage medium, and when the computer program is executed by a processor, the method embodiment in any of the foregoing FIGS. 3 to 8 is implemented. The computer-readable storage medium may be Read-Only Memory (ROM), Random Access Memory (RAM), a magnetic disk or an optical disk, etc.

It should be appreciated that, in the context, such terms as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., Read-Only Memory (ROM)/Random Access Memory (RAM), magnetic disk or optical disk) and include several instructions so as to enable a terminal device (mobile phone, computer, server, air conditioner or network device) to execute the method in the embodiments of the present disclosure.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A first base station, comprising:
a memory, a processor, and a computer program stored in the memory and executed by the processor, wherein the processor is configured to execute the computer program so as to implement steps of:
receiving, by the first base station, first information transmitted by a second base station, wherein the first information comprises identification information of a user equipment (UE), identification information of a first serving cell of the UE, and service frequency of the first serving cell, and the second base station is a serving base station of the first serving cell; and
transmitting, if the first base station determines that the UE is self-interfered based on the first information, notification information to the second base station, wherein the notification information is used to negotiate with the second base station to allocate a different resource to the UE.

2. The first base station according to claim 1, wherein after transmitting the notification information to the second base station, the processor further implements a step of:
receiving a response message from the second base station,
wherein the response message is used to indicate the resource allocated by the second base station to the UE.

3. The first base station according to claim 1, Wherein the receiving, by the first base station, first information transmitted by the second base station comprises:
receiving, by a centralized unit (CU) of the first base station, first information transmitted by the second base station and transmitting the first information to a distributed unit (DU) of the first base station through a first interface, where the first interface is an interface between the CU and the DU.

4. The first base station according to claim 3, Wherein the determining, by the first base station, that the UE is self-interfered based on the first information comprising:
receiving, by the DU, the first information through the first interface, and determining the self-interference of the UE based on the first information.

5. The first base station according to claim 4, wherein the transmitting the notification information to the second base station comprises:
transmitting, by the DU, the notification information to the CU through the first interface;
receiving, by the CU, the notification information through the first interface and transmitting the notification information to the second base station.

6. The first base station according to claim 4, wherein the transmitting the notification information to the second base station comprises:

transmitting, by the DU, second information to the CU through the first interface; wherein the second information includes identification information of the UE, identification information of a second serving cell of the UE, and a first resource allocated by the first base station to the UE, the first base station is a serving base station of the second serving cell;

receiving, by the CU, the second information through the first interface and transmitting the notification information to the second base station based on the second information.

7. The first base station according to claim 6, wherein after receiving the response message transmitted by the second base station, the processor further implements steps of:

transmitting, by the CU, resource indication information to the DU through the first interface based on the response message, wherein the resource indication information includes the identification information of the UE, the identification information of the second serving cell of the UE, and the resource allocated by the second base station to the UE;

receiving, by the DU, the resource indication information through the first interface and allocating the resource to the UE based on the resource indication information.

8. The first base station according to claim 6, wherein the notification information further comprises a start use time and a stop use time of the first resource.

9. The first base station according to claim 6, wherein the notification information further comprises second indication information, the second indication information is used to indicate that the first resource is a dedicated resource of the UE; or, is used to indicate that the first resource is a common resource of N UEs, the N UEs include the UE, and the N UEs are all in the second serving cell of the UE, and N is a positive integer greater than or equal to 2.

10. The first base station according to claim 1, wherein the notification information comprises second information, the second information is used to instruct the second base station to allocate a resource different from the first resource to the UE, the second information includes identification information of the UE, and identification information of a second serving cell and a first resource allocated by the first base station to the UE, the first base station is a serving base station of the second serving cell.

11. The first base station according to claim 1, wherein the notification information comprises information of the second resource, and the information of the second resource is used to instruct the second base station to allocate a second resource to the UE, the second resource is different from the first resource, and the first resource is the resource allocated by the first base station to the UE.

12. The first base station according to claim 1, wherein the resource comprises at least one of a time slot, a half time slot, a sub-frame, a frame, a physical resource block (PRB), a PRB group, or Bandwidth Part (BWP).

13. The first base station according to claim 1, wherein the first base station is a master serving base station of the UE.

14. A second base station, comprising:

a memory, a processor, and a computer program stored in the memory and executed by the processor, wherein the processor is configured to execute the computer program so as to implement steps of:

transmitting, by the second base station, first information to the first base station, wherein the first information includes identification information of the UE, identification information of a first serving cell of the UE, and service frequency of the first serving cell, and the second base station is a serving base station of the first serving cell;

receiving, by the second base station, notification information transmitted by the first base station, and the notification information is used to negotiate with the second base station to allocate a different resource to the UE.

15. The second base station according to claim 14, wherein after allocating, by the second base station, a resource to the UE based on the notification information, the processor further implements a step of:

transmitting, by the second base station, a response message to the first base station, wherein the response message is used to indicate the resource allocated by the second base station to the UE.

16. The second base station according to claim 14, wherein the notification information comprises second information, the second information is used to instruct the second base station to allocate a resource different from the first resource to the UE, wherein the second information includes identification information of the UE, the identification information of a second serving cell and a first resource allocated by the first base station to the UE, the first base station is a serving base station of the second serving cell;

the allocating, by the second base station, the resource to the UE based on the notification information comprises allocating, by the second base station, a resource different from the first resources to the UE based on the second information.

17. The second base station according to claim 16, wherein the notification information further comprises a start use time and a stop use time of the first resource.

18. The second base station according to claim 14, wherein the notification information comprises information of the second resource, and the information of the second resource is used to instruct the second base station to allocate a second resource to the UE, the second resource is different from the first resource, and the first resource is the resource allocated by the first base station to the UE;

the allocating, by the second base station, the resource to the UE based on the notification information comprises allocating, by the second base station, the second resource to the UE based on the information of the second resource.

19. The second base station according to claim 14, wherein the resource comprises at least one of: a time slot, a half time slot, a sub-frame, a frame, PRB, a PRB group, or BWP, wherein the second base station is a secondary serving base station of the UE.

20. A non-transitory computer-readable storage medium storing therein a computer program, the computer program is executed by a processor to implement steps of:

receiving, by the first base station, first information transmitted by the second base station, wherein the first information comprises identification information of the UE, identification information of a first serving cell of the UE, and service frequency of the first serving cell, and the second base station is a serving base station of the first serving cell; and transmitting, if the first base station determines that the UE is self-interfered based on the first information, notification information to the second base station, wherein the notification information is used to negotiate with the second base station to allocate a different resource to the UE.

\* \* \* \* \*